March 24, 1925.
W. G. PANCOAST
AUTOMOBILE BUMPER
Filed Jan. 31, 1923
1,531,022
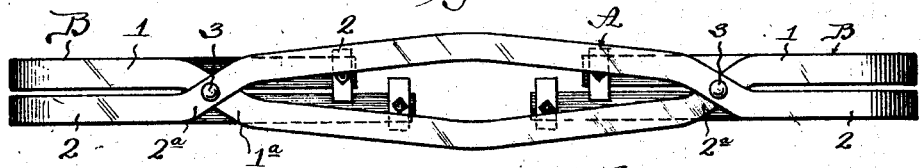
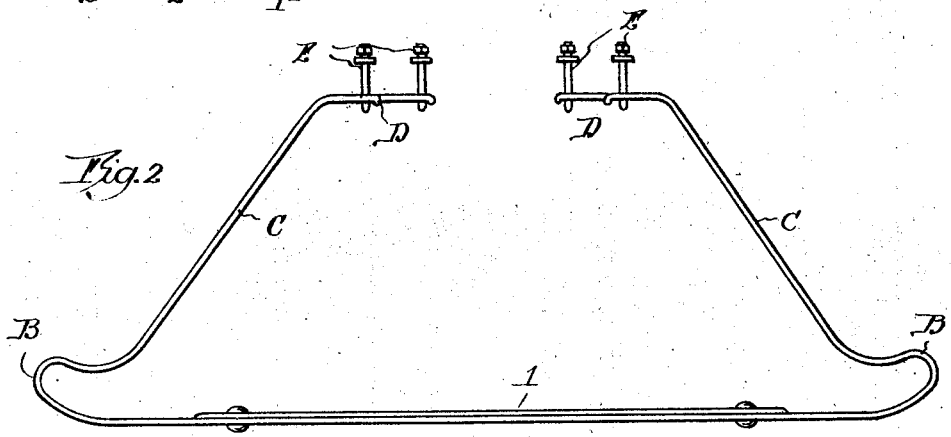
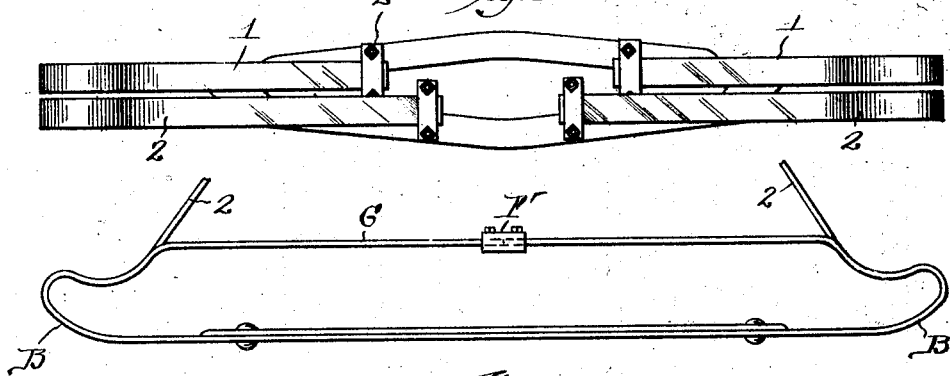
Inventor,
William G. Pancoast, Patented Mar. 24, 1925.

1,531,022

UNITED STATES PATENT OFFICE.

WILLIAM G. PANCOAST, OF WILMETTE, ILLINOIS, ASSIGNOR TO BIFLEX PRODUCTS COMPANY, OF WAUKEGAN, ILLINOIS, A CORPORATION OF DELAWARE.

AUTOMOBILE BUMPER.

Application filed January 31, 1923. Serial No. 616,021.

*To all whom it may concern:*

Be it known that I, WILLIAM G. PANCOAST, a citizen of the United States, and a resident of Wilmette, in the county of Cook and State of Illinois, have invented certain new and useful Improvements in Automobile Bumpers, of which the following is a specification.

This invention relates to improvements in bumpers of automobiles, and more particularly to bumpers of that type which are not only constructed of resilient bars, but the bars are spaced apart or offset vertically so as to provide an impact area of increased width, preferably more pronounced throughout the central portion of the impact member.

The object of the invention is to provide a novel construction for a bumper embodying the characteristics hereinabove set forth, and one that is more especially designed for Ford automobiles which, owing to their peculiar construction, make it necessary to carry the impact member a considerable distance forwardly of the points of attachment.

It is a further object of the invention to provide a new and simple construction with but few parts comprising two bars so offset and crossed and overlapped as to form braced yet resilient construction, but suited to withstand the impacts to which automobile bumpers are subjected.

In the accompanying drawings a preferred embodiment of the invention, as applicable to a Ford automobile is disclosed, and wherein—

Fig. 1 is a view in front elevation of the bumper,

Fig. 2 is a top plan view of the bumper showing a preferred treatment of the bars and method of attaching the bumper, Fig. 3 is a view in rear elevation of the bumper, and Fig. 4 is a top plan view of the bumper showing a modified construction.

The bumper herein disclosed, and presently to be described in detail, may be said to be made up of two flat bars extending throughout the entire structure in vertically spaced relation and with their faces or surfaces of greater width disposed in the same vertical plane. The bars are substantially counterparts of each other, and for the most part parallel with each other and lie in substantially the same vertical plane.

These bars are individually shaped to conform to the general outline of the bumper as it appears in top plan view, Fig. 2, to provide the central impact section A which terminates in inwardly bent U-shaped end portions B, and thence continued inwardly and rearwardly in the form of arms C, C, which in turn are provided with laterally bent end portions D, D, extending parallel to the impact member and attached flatwise to the vehicle frame members by means of U-bolts E, E.

The individual bars, which may be identified as 1 and 2, extend throughout all portions of the bumper, and, with the exception of the central impact portion A, these bars extend parallel with each other in the same vertical plane and separated by a comparatively small space. This relationship is maintained throughout the end portions B, B, which extend inwardly from the ends of the bumper substantially one quarter of its length. At these points each of the bars is provided with vertically offset portions which form the central impact section A as well as relatively short and more abruptly offset intermediate portions $1^a$ and $2^a$, which intersect or cross each other at an obtuse angle. In this manner the bar 1, which is disposed above the bar 2 throughout the end and rear portions B and C, is offset downwardly at the points of intersection, thus becoming the lower bar of the central impact section A. Similarly, the bar 2, which is the lower bar throughout the end and rear sections B and C, is offset upwardly at the points of crossing or intersection and becomes the upper bar of the central impact section. Passing through the bars at the points of intersection are fastening members 3, 3, preferably in the form of rivets, although clamping members or other means of connection may be employed.

Throughout the central impact section A the portions of the bars 1 and 2 forming the same are separated vertically at a greater distance than throughout the remaining portions of the bumper. In fact, they diverge slightly toward the center of said section, thus giving the same a somewhat oval shape. However, the portions of the bars forming this central impact area A may be shaped so that the section may be uniform in width substantially throughout its length although the increased width is maintained in order to provide a larger impact area throughout the central portion of the bumper. Moreover, in the crossing of the bars at either end of the central impact area, it is necessary to offset the bars horizontally as is shown in Fig. 2, with the result that the portions of the bars forming the central impact area A are not disposed in the same vertical plane. It would be possible, however, and perhaps desirable, to offset the bars throughout the intersecting portions so that the intermediate portions may be brought back into the same plane, this being merely a matter of design.

As before described, the end portions B, B have the form of loops which are provided by bending the bars rearwardly and inwardly, thus providing added resiliency in the structure. The rearwardly extending portions C, C are continuations of the end portions B, B which converge at an angle of substantially thirty degrees as they extend rearwardly and terminate in the end portions D, D. As before explained, the longitudinal distance between the forward portion of the bumper and the end portions D, D is determined by the distance that the frame members of a Ford automobile are disposed rearwardly of the front wheels.

As a preferable arrangement, the bars 1 and 2 are attached separately to the vehicle frame and by individual U-bolts E. For this reason the upper bar 1 terminates short of the lower bar 2, that is, in staggered relation, so that a U-bolt may be applied to the end of each bar without interference. It is also desirable to upset the ends of each bar so as to prevent endwise movement after the U-bolts have been applied and tightened.

In Fig. 4 a slight modification of the bumper has been illustrated wherein all portions are formed in the same manner as already described, with the exception of the rearwardly extending portions of one of the bars. In this instance, the lower bar 2 is continued rearwardly for attachment to the vehicle in the manner already described, whereas the end portions of the upper bar 1 are bent inwardly just beyond the end sections B, B, and extended parallel to the forward portion of the bumper and a short distance rearwardly thereof. These end portions are brought together in abutting engagement and secured by means of a clamping member F and thus form a solid reinforcing bar G immediately behind the impact portion of the bumper.

A bumper constructed in accordance with the foregoing disclosure combines the features of increased strength due to the double bar construction throughout, and in addition provides the wide impact area which affords greater protection to the vehicle.

I claim as my invention—

1. A bumper comprising a pair of resilient bars spaced apart vertically throughout the end portions of the impact member and bent rearwardly and inwardly to form U-shaped ends and thence beyond the U-shaped ends to provide free end portions for attachment to a vehicle.

2. A bumper comprising a pair of resilient bars extending in vertically spaced relation throughout the central and end portions of the impact member thereof and bent rearwardly and inwardly to form U-shaped end sections and thence rearwardly from the said end sections to provide arms terminating in staggered ends adapted for attachment to a vehicle.

3. A bumper comprising an impact member and attaching arms extending rearwardly from the ends thereof and a pair of resilient bars extending in vertically spaced relation throughout said impact member, one of said bars being extended rearwardly for attachment at its ends to a vehicle.

4. A bumper comprising a pair of resilient bars spaced apart in vertically offset relation to form an impact member consisting of end portions of uniform width, a central impact area of increased width and intermediate intersecting portions secured together, one of said bars forming rearwardly extending arms adapted for attachment at its ends to the vehicle.

In witness whereof, I hereunto subscribe my name this 26th day of January, A. D., 1923.

WILLIAM G. PANCOAST.